June 7, 1966　　　R. C. GERSCH　　　3,254,548
BORING QUILL

Filed April 13 1964　　　　　　　　　　4 Sheets-Sheet 1

INVENTOR.
RICHARD C. GERSCH
BY Whittemore
Hulbert & Belknap
ATTORNEYS

June 7, 1966 R. C. GERSCH 3,254,548
BORING QUILL
Filed April 13 1964 4 Sheets-Sheet 2

INVENTOR.
RICHARD C. GERSCH
BY Whittemore
Hulbert & Belknap
ATTORNEYS

June 7, 1966  R. C. GERSCH  3,254,548
BORING QUILL

Filed April 13 1964  4 Sheets-Sheet 3

INVENTOR.
RICHARD C. GERSCH
BY Whittemore
Hulbert & Belknap
ATTORNEYS

United States Patent Office 3,254,548
Patented June 7, 1966

3,254,548
BORING QUILL
Richard C. Gersch, Southfield, Mich., assignor to Briney Manufacturing Co., Detroit, Mich., a corporation of Michigan
Filed Apr. 13, 1964, Ser. No. 359,033
12 Claims. (Cl. 77—58)

The invention relates to boring quills and refers more specifically to an automatically adjustable boring quill.

During production boring operations in which a plurality of articles are bored to the same size, wear of the boring bit held in a boring quill will eventually cause the produced items to be bored undersize. It is therefore necessary to periodically check the size of the bored articles and when the articles are outside of predetermined tolerances to stop the spindle and adjust the boring quill to compensate for wear of the boring bit.

Adjustment of boring quills without removing locking screws and the like has in the past been known as the result of, for example, Briney Patent No. 2,558,815, wherein an eccentric sleeve carrying the boring bit is carried in an opening in a boring quill between prestressed bearings. In the past however the spindle to which the quill is attached for rotation has had to be stopped to permit adjustment of the quill even by rotation of an eccentric sleeve.

The stopping of the spindle in a production boring operation while a delicate quill adjustment is made is undesirable in that it reduces the working time and thus the productive output of the boring machine.

It is therefore an object of the present invention to provide an improved boring quill.

Another object is to provide an automatically adjustable boring quill.

Another object is to provide a boring quill mounted on a spindle for rotation therewith and means operably associated with the spindle and quill for automatically adjusting the quill while the spindle is rotating.

Another object is to provide boring apparatus comprising a quill including a member rotatable to adjust a boring bit carried thereby eccentrically mounted on a spindle for rotation therewith and adjusting means mounted on said spindle and engaged with said member operable during rotation of said spindle for rotating the member in predetermined increments.

Another object is to provide a structure as set forth above wherein the adjusting means comprises a rod extending through and rotatable with the spindle, a splined sleeve secured to the eccentrically mounted member and a splined shaft connected to the rod and engaged with the splined sleeve for rotating the member in increments on axial movement of the rod.

Another object is to provide a structure as set forth above wherein the adjusting means comprises a rod extending through and rotatable with the spindle, a slotted sleeve secured to the eccentrically mounted member and pin means operable between the rod and slotted sleeve for rotating the member in increments on incremental axial movement of the rod.

Another object is to provide structure as set forth above wherein the adjusting means comprises a reciprocally movable rod extending through and rotatable with the spindle, a helical gear fixedly secured to the end of the rod, a one-way clutch mounted in said spindle, a second helical gear fixedly secured to one side of the one-way clutch and in mesh with the helical gear on the rod, a spur gear connected to the other side of the one-way clutch and a spur gear connected to the eccentrically mounted member for rotation therewith in mesh with the spur gear fixedly secured to the said other side of the one-way clutch whereby on reciprocation of the rod rotational movement in one direction of the eccentrically mounted member is produced.

Another object is to provide boring apparatus as set forth above wherein adjustment of the eccentrically mounted member is accomplished through rotation of a worm carried by the quill and further including a reciprocally movable rod extending through the spindle and an adapter positioned between the quill and spindle including a gear train and one-way clutch for changing reciprocal movement of the rod into uni-directional rotary motion of the worm.

Another object is to provide an improved boring quill which is simple in construction, economical to manufacture and efficient in use.

Other objects and features of the invention will become apparent as the description proceeds, especially when taken in conjunction with the accompanying drawings, illustrating preferred embodiments of the invention, wherein.

With particular reference to the figures of the drawings, one embodiment of the present invention will now be considered in detail.

Figure 1:
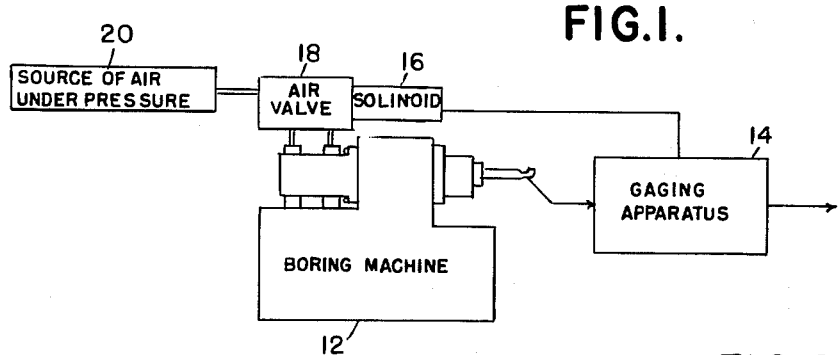
FIGURE 1 is a block diagram of a production boring machine including structure for automatically adjusting a boring quill carried thereby constructed in accordance with the invention.

In FIGURE 1 the automatically adjustable boring quill 10 of the invention is illustrated in its environment including the boring machine 12 of which it is an integral part, gaging apparatus 14, solenoid 16, air valve 18 and source of air under pressure 20.

In operation the boring machine produces articles having, for example, an internally bored opening. The produced articles are fed from the boring machine to gaging apparatus 14 which operates to determine if the bored opening is within manufacturing tolerances. If for any reason as, for example, wear of boring bit 22 secured in quill 10, the opening is undersized in a gaged article, a signal is sent from the gaging apparatus 14 to energize solenoid 16, whereby air valve 18 is caused to operate to admit actuating pressure from the source of air under pressure 20 to the cylinder 24, whereby the quill 10 is automatically adjusted to compensate for the wear of the bit 22 in accordance with the present invention.

Boring machines 12, gaging apparatus 14 and means for operating air valves in accordance with electrical signals, such as may be produced by gaging apparatus 14, are known in the machine tool art and are intended to form no part of the present invention. They will therefore not be considered in greater detail.

Figure 2:
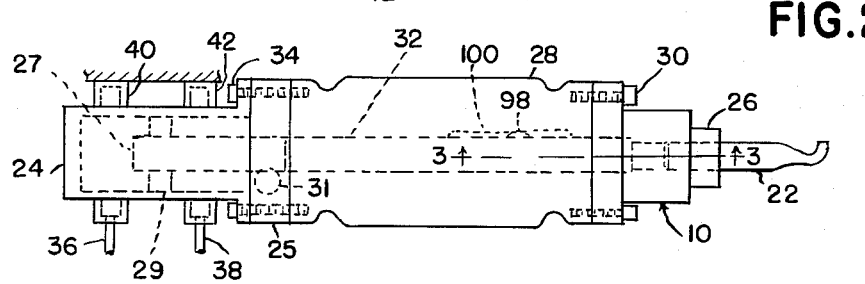
FIGURE 2 is a view of a portion of the boring machine illustrated in FIGURE 1 including a spindle, a quill secured to the spindle and means for automatically adjusting the quill during rotation of the spindle constructed in accordance with the invention.

The spindle 28, cylinder 24, adapter 25 and automatically adjustable quill 10 constructed in accordance with the invention are shown in somewhat more detail in FIGURE 2. In FIGURE 2 the quill 10 adjustably supporting the boring bit 22 in the sleeve 26 is secured to the rotatable spindle 28 of machine 12 by convenient means, such as bolts 30. The sleeve 26 of quill 10 is rotatably adjusted relative to the spindle 28 on axial movement of the rod 32. Rod 32 is axially movable toward quill 10 in predetermined increments on actuation of the cylinder 24 to reciprocate piston rod 27 secured to piston 29 by air passed through conduits 36 and 38 connected to manifolds 40 and 42 respectively due to the one-way clutch 31 carried by adapter 25 and connected to the piston rod 27 and rod 32. The adapter 25 is sandwiched between the cylinder 24 and spindle 28 with the cylinder 24 bolted to the spindle 28 through adapter 25 by bolts 34. The manifolds 40 and 42 are rigidly secured in a fixed position relative to the spindle.

The cylinder 24 for moving the rod 32 toward the quill 10 in predetermined increments during each actuation of the cylinder 24 is available as an off-the-shelf purchased item and the details thereof form no part of the present invention. Similarly, the details of the adapter 25 will not be discussed herein.

Figure 3:
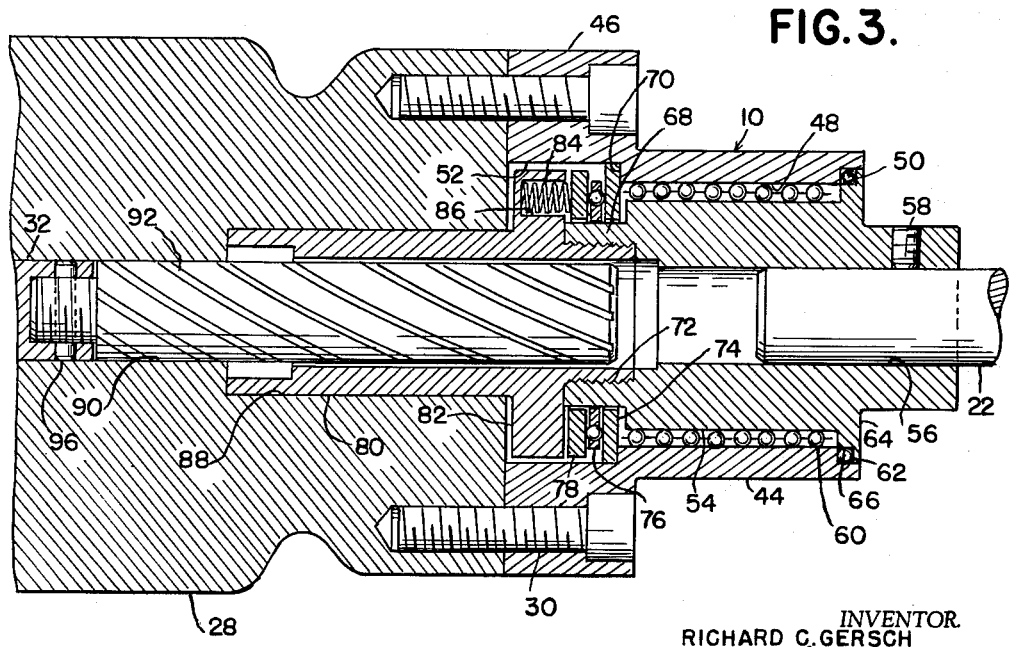
FIGURE 3 is a longitudinal section view of the improved quill and means for automatically adjusting the quill illustrated in FIGURE 2 taken substantially on the line 3—3 in FIGURE 2.

As shown best in FIGURE 3, the automatically adjustable quill 10 includes an outer generally cylindrical body member 44 having the annular flange 46 extending radially outwardly from the inner end thereof through which bolts 30 extend into the spindle 28 for securing the quill 10 to the spindle 28. Body member 44 of quill 10 is also provided with an eccentric opening 48 extending therethrough having the enlarged diameter portions 50 and 52 at the opposite ends thereof.

Sleeve 54 is provided with an opening 56 therethrough in which a boring bit 22 may be secured by means of the set-screw 58. Sleeve 54 is positioned within the opening 48 in body member 44 and is held in radially spaced relation thereto by the prestressed bearings in cylindrical bearing cage 60.

The axial position of the sleeve 54 of quill 10 with respect to the body member 44 thereof is determined by the annular bearing 62 set in the enlarged diameter portion 50 of the opening 48 in the body member 10 and held therein by the flange 64 on sleeve 54 having the corresponding annular groove 66 therein.

Sleeve 54 is further provided with the reduced diameter portion 68 on the inner end thereof forming annular abutment 70 thereon. Further the inner end of the sleeve 54 is provided with a threaded enlarged internal diameter portion 72, as shown best in FIGURE 3.

In assembly the annular bearing plate 74 is sleeved over the reduced diameter inner end portion of sleeve 54 and positioned against abutment 70 within the enlarged diameter portion 52 of the opening 48 through body member 44. The annular bearing 76 is then positioned against bearing plate 74 and held against bearing plate 74 by means of another annular bearing plate 78.

An internally splined sleeve 80 is then threadedly engaged with the sleeve 54 with the radially outwardly extending annular flange 82 overlying the bearing plate 78. Flange 82 and bearing plate 78 are maintained in relation by means of spring 84 positioned in recesses 86 located angularly about the flanges 82. Splined sleeve 80 is positioned in the radially enlarged portion 88 of the opening 90 extending through the spindle 28.

A splined rod 92 is inserted within the splined sleeve 80 and is threadedly connected with the piston rod 94, as shown in FIGURE 3. Pin 96 insures a positive non-rotating connection between the splined rod 92 and the piston rod 94.

In operation on actuation of the cylinder 24 to move piston rod 27 toward quill 10, the rod 32 which is held against rotation by convenient means, such as a key 98 secured to rod 32 movable in slot 100 in spindle 28, is caused to move forward a predetermined increment, whereby the splined rod 92 is moved forward the same increment causing the splined sleeve 80 and the sleeve 54 which are rigidly secured together to rotate in accordance with the predetermined increment. Adjustment of the radial position of the cutting edge of a boring bit 22 secured in the sleeve 54 is thus accomplished due to the inner action of eccentric opening 48 and sleeve 54.

It will therefore be seen that small accurate adjustments of the boring bit 22 sufficient to adjust the bit 22 for inaccuracies due to wear of the bit in production operation is possible with the quill structure 10 without stopping the rotation of the spindle 28. Further the adjustment of the boring bit 22 requires no loosening or tightening of locking members and no setting other than the initial selection of the increment of adjustment by choosing the increment of axial movement of the rod 32 and the spline pitch on the sleeve 80 and splined rod 92.

Figure 4:
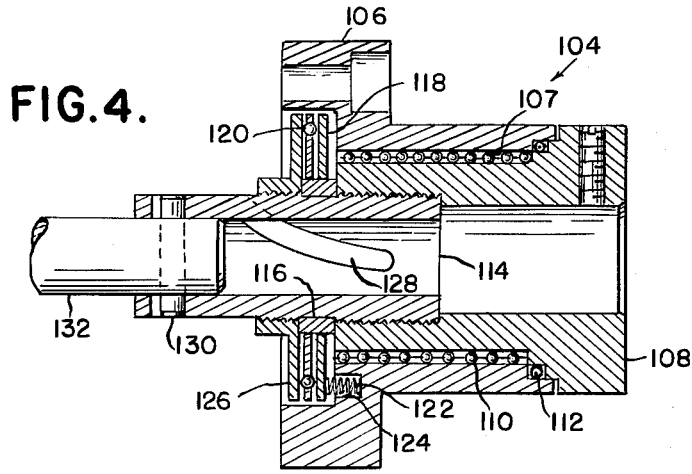
FIGURE 4 is a longitudinal section view of a modification of the quill and means for automatic adjustment thereof illustrated in FIGURE 3.

A modification 102 of the boring quill 10 of the invention is illustrated in FIGURE 4. The modified boring quill includes a body member 106 having an eccentric opening 107 extending axially therethrough, a concentric sleeve 108, a cylindrical bearing 110 and an annular bearing 112 entirely similar to body member 44, sleeve 54, cylindrical bearing 60 and annular bearing 62 of quill 10 illustrated in FIGURE 3.

The quill 104 is however provided with a slotted sleeve 114 having bushing 116 thereon and threadedly engaged at one end with the inner end of the sleeve 108. Annular bearing plate 118 and bearing 120 mounted on bushing 116 cooperate with springs 122 positioned in angularly spaced recesses 124 and bearing plate 126 threadedly secured to the sleeve 114 to maintain the body member 106, sleeve 108 and bearings 110 and 112 in assembly.

Sleeve 114 is provided with angularly and axially extending opposed slots 128 therein engaged by the opposite ends of pin 130 which is secured to the rod 132. Again the quill 104 is secured to a spindle, such as spindle 28 illustrated in FIGURE 3, and the rod 132 extends through an axial opening in the spindle to connect through a one-way clutch to a reciprocal piston rod (not shown).

In operation, as the rod 132 is moved toward the quill 104 in FIGURE 4 and is secured against rotation as by means of the key and slot arrangement 98 and 100 illustrated in FIGURE 2, the slotted sleeve 114 is caused to rotate due to engagement of the pin 130 within the slots 128. The sleeve 108 and any tool bit carried therein is thus caused to be adjusted since the sleeve 114 and sleeve 108 in eccentric opening 107 are connected against relative rotation.

Figure 6:
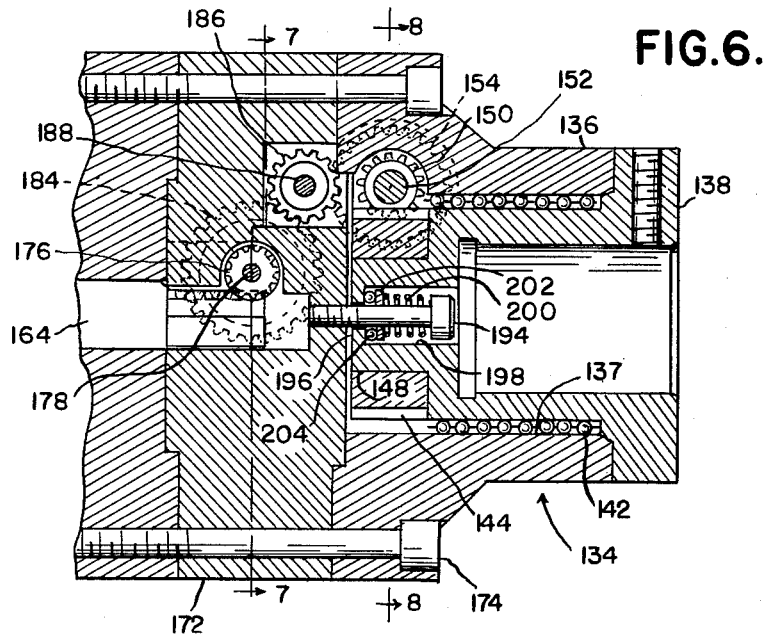
FIGURE 6 is a longitudinal section view of the adapter and boring quill illustrated in FIGURE 5 taken substantially on the line 6—6 in FIGURE 7.

The quill 134 illustrated in FIGURE 6 is similar to the quills 10 and 104 in that it includes a similar body member 136 having eccentric opening 137 extending axially therethrough and a sleeve 138 mounted therein for adjustably receiving a boring bit 140 and is provided with the cylindrical bearing 142 for maintaining the sleeve 138 and body member 136 in predetermined radial relation. Adjustment of the sleeve 138 in eccentric opening 137 in quill 134 is however by rotation of the worm gear 144 which is secured to the reduced diameter end 146 of sleeve 138.

Figure 7:
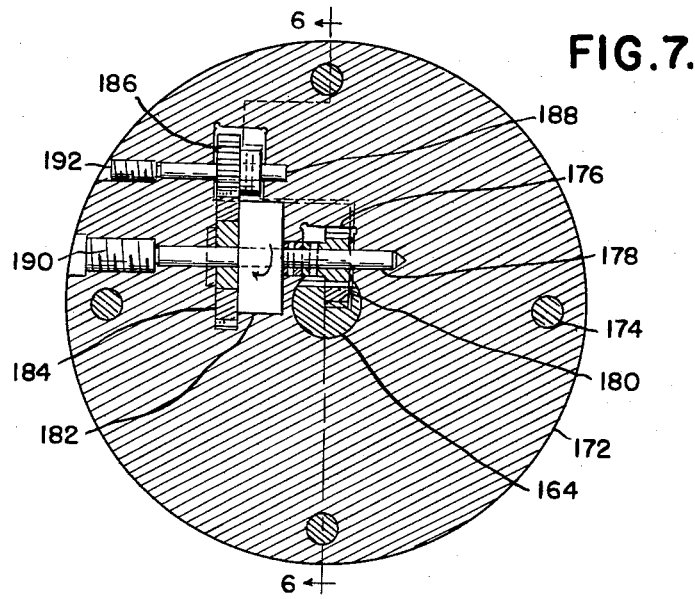
FIGURE 7 is a transverse section view of the adapter illustrated in FIGURES 5 and 6 taken substantially on the line 7—7 in FIGURE 6.
Figure 8:
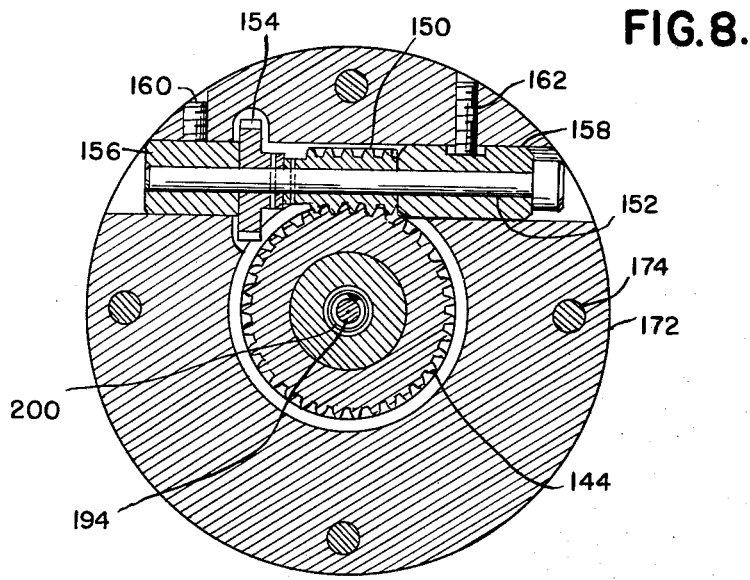
FIGURE 8 is a transverse section view of the boring quill illustrated in FIGURES 5 and 6 taken substantially on the line 8—8 in FIGURE 6.

As shown best in FIGURE 7 rotation of the worm gear 144 is accomplished on rotation of worm 150 mounted on pin 152 for rotation therewith. Pin 152 is in the present instance rotated on rotation of gear 154 fixedly secured to the pin 152. Pin 152 is rotatably secured in the bearing blocks 156 and 158 which are held in position by the set-screws 160 and 162.

Figure 5:
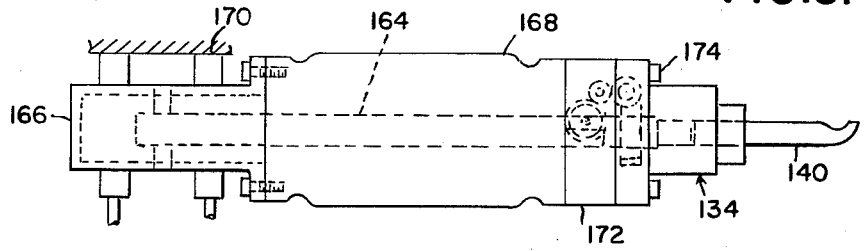
FIGURE 5 is a view of a spindle, boring quill and means for automatically adjusting the boring quill during rotation of the spindle including an adapter positioned between the spindle and quill constructed in accordance with the invention.

As shown best in FIGURES 5 and 6 rotation of the gear 154 on reciprocal movement of the piston rod 164 by means of the reciprocal piston and cylinder construction 166 secured to spindle 168 and actuated through air manifolds 170 secured in a fixed position about the construction 166 is through an adapter 172 bolted to the spindle 168 by means of bolts 174 extending through both the adapter 172 and quill 134, as best shown in FIGURE 6.

Adapter 172 includes a pinion 176 fixedly secured to pin 178 and rotatable in opposite directions on reciprocation of piston rod 164 having rack 180 secured thereon in mesh with pinion 176. Rotation of the pin 178 in one direction causes part of the one-way clutch 182, one-half of which is secured to the pin 178, to rotate therewith. The other half of the one-way clutch 182 which is secured to the gear 184 produces movement of the gear 184 in only one rotational direction. Gear 184 is meshed with the gear 186 which is mounted on pin 188 and which is engaged with the gear 154 of quill 134 for rotation thereof in one direction on reciprocation of the piston rod 164.

Pins 178 and 188 are secured in their assembled position by means of screws 190 and 192 respectively.

The sleeve 138 is resiliently secured to the adapter 172 by means of bolt 194 threadedly engaged in the adapter 172 in conjunction with the flanges 196 extending radially inwardly of the inner end of the opening 198 in the sleeve 138 in conjunction with the spring 200, washer 202 and annular bearing 204.

Figure 9:
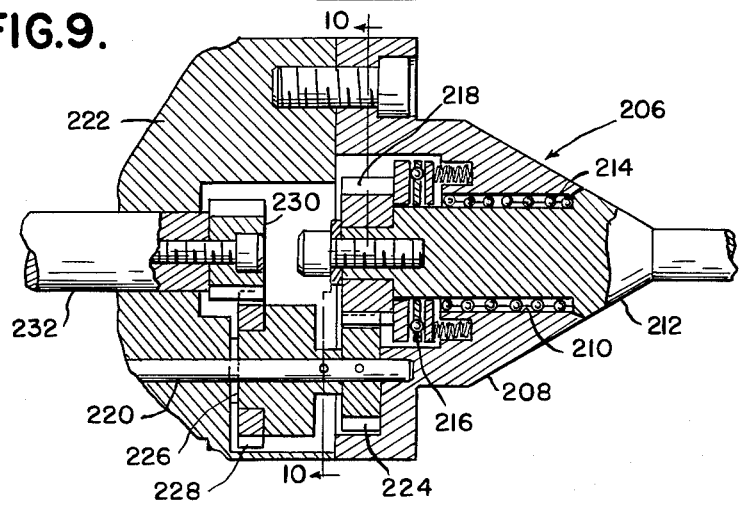
FIGURE 9 is a longitudinal section view of another modification of the quill and means for automatic adjustment thereof illustrated in FIGURE 3.
Figure 10:
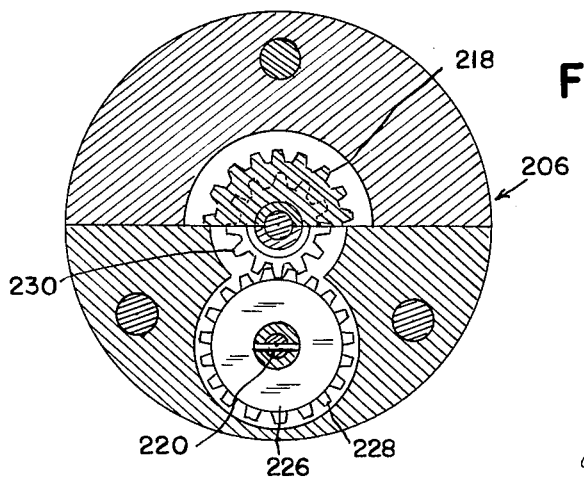
FIGURE 10 is a transverse section view of the modified quill and means for automatic adjustment thereof illustrated in FIGURE 9 taken substantially on the line 10—10 in FIGURE 9.

The modified boring quill 206, illustrated in FIGURES 9 and 10, includes a body member 208 having the stepped eccentric opening 210 extending axially therethrough, a tool mounting member 212, and a cylindrical bearing 214 similar to body member 44, sleeve 54 and cylindrical bearing 60 of quill 10.

The quill 206 is further provided with a spur gear 218 secured to the member 212 for rotation therewith. In addition the modified quill structure 206 includes a shaft 220 rotatably mounted between the quill 206 and spindle 222. Spur gear 224 is mounted on shaft 220 in body member 208 in mesh with spur gear 218 for rotation with the shaft 220. One-way clutch 226 is also mounted on shaft 220 with one end thereof fixed to the shaft 200. The helical gear 228 is mounted on the other end of the one-way clutch 226 for rotation therewith and is in mesh with the helical gear 230 fixedly secured to the rod 232 for axial and rotational movement therewith.

Thus in operation of the modified quill structure 206 on axial movement of the rod 232 in one direction the helical gear 228 will be rotated in one direction to similarly rotate the shaft 220 through one-way clutch 226. Consequently the meshed spur gears 224 and 218 and the tool carrying member 212 are similarly rotated to adjust a cutting tool carried by member 212 due to the inner action between the member 212 and the eccentric opening 210 through the body member 208. On movement of the shaft 232 axially in the opposite direction the helical gear 228 is caused to rotate in the opposite direction. However, due to the one-way operation of the clutch 226 the spur gears 224 and 218 are not similarly rotated. Incremental rotational adjustment of the tool carrying member 212 in one direction is thus accomplished on reciprocal movement of the shaft 232 which is fixed against rotation as before.

While particular embodiments and modifications of the present invention have been disclosed in detail herein, it will be understood that other embodiments and modifications of the invention are contemplated. It is therefore the intention to include all embodiments and modifications of the invention as are defined by the appended claims within the scope of the invention.

What I claim as my invention is:

1. An automatically adjustable boring quill comprising a body member having an eccentric opening extending therethrough, means for securing the body member to one end of a rotatable spindle, a concentric sleeve positioned within the opening in the body member, a prestressed cylindrical bearing positioned between the sleeve and body member within the opening in the body member, a flange extending radially outwardly from the concentric sleeve, an annular thrust bearing positioned between the flange and body member, a pair of annular bearing plates positioned within the body member, an annular thrust bearing positioned between the bearing plates, a splined sleeve secured to the end of the concentric sleeve within the opening in the body member and resilient means operable between one of the annular bearing plates and splined sleeve for urging the concentric sleeve into the opening in the body member and a longitudinally movable non-rotatable splined rod engaged with said splined sleeve for producing rotation of the splined sleeve and concentric sleeve on axial movement thereof.

2. An automatically adjustable boring quill comprising a body member having an opening extending therethrough, means for securing the body member to one end of a rotatable spindle, a concentric sleeve positioned within the opening in the body member, a prestressed cylindrical bearing positioned between the body member and concentric sleeve within the opening in the body member, a flange extending radially outwardly from the concentric sleeve, an annular thrust bearing positioned between the flange and body member, a sleeve having circumferentially and longitudinally extending opposed slots therein secured to the concentric sleeve for rotation therewith, an annular bearing positioned on the slotted sleeve, a first annular bearing plate and bearing sleeved over said annular bearing and a second annular bearing plate secured to the slotted sleeve on the other side of the first annular bearing plate, resilient means operable between the body member and first annular bearing plate for urging the first bearing plate and body member in opposite directions and a pin mounted for transverse reciprocation extending between the opposed slots in the slotted sleeve for rotating the slotted sleeve and connected concentric sleeve together on transverse movement of the pin.

3. An automatically adjustable boring quill comprising a body member having an eccentrically positioned opening extending axially therethrough, means for securing the body member to one end of a rotatable spindle, a rotatable tool holding member positioned within the opening in the body member, a prestressed cylindrical bearing positioned between the body member and rotatable member within the opening in the body member, a flange having an annular tapered bearing surface extending radially outwardly of the rotatable member, a corresponding annular tapered bearing surface on the body member engaged with the tapered surface on the rotatable member to determine the relative axial position thereof, a first spur gear secured to the end of the rotatable member within the opening for rotation therewith, annular bearing means positioned between the spur gear and body member for facilitating relative rotation between the rotatable member and body member, a second spur gear rotatably mounted in said body member in mesh with the first spur gear, a one-way clutch one end of which is secured to the second spur gear, a helical gear secured to the other end of the one-way clutch and a second helical gear in mesh with the first mentioned helical gear for rotating said helical gear and second spur gear in only one direction through said one-way clutch on transverse movement of the second helical gear.

4. In combination a rotatable spindle, a boring quill supported on one end of the spindle for rotation therewith, a piston rod axially reciprocally positioned in the spindle, piston and cylinder means secured to the other end of the spindle operable on actuation thereof to produce predetermined reciprocal movement of the piston rod and separate adapter means positioned between the piston rod and quill for automatically adjusting the quill on reciprocation of the rod.

5. Structure as set forth in claim 4 wherein the quill comprises a body member including an eccentric opening extending therethrough, a concentric sleeve mounted in the opening in the body member, a prestressed cylindrical bearing positioned between the sleeve and body member within the opening therethrough, a worm gear secured to the sleeve and a worm rotatably mounted in the body member for rotating the worm gear and sleeve on rotation thereof and a gear also mounted in the body member for rotation of the worm on rotation thereof.

6. Structure as set forth in claim 5 wherein the adapter comprises a body member, a pinion rotatably supported in the body member, a reciprocal rod having a rack on one end engaged with the pinion in the adapter body member, an output gear mounted in the adapter for engagement with the worm rotating gear of the quill and one-way clutch means operable between the pinion and output gear for actuating the output gear in one direction only on reciprocation of the rod.

7. Structure as set forth in claim 6 and further including means for resiliently securing the sleeve to the adapter body member.

8. An adapter comprising a body member, a pinion rotatably supported in the body member for engagement with a reciprocal rod, an output gear rotatably mounted in the body member of the adapter and one-way clutch means operable between the pinion and output gear for actuating the output gear in one direction on reciprocation of a rod engaged with the pinion.

9. A rotatable spindle, an adjusting shaft extending axially through said rotatable spindle on the axis of rotation thereof and carried by said spindle for rotation therewith and axial movement relative thereto, means connected to one end of the adjusting shaft for moving the adjusting shaft axially of the rotatable spindle with the spindle rotating, a quill at the other end of the adjusting shaft including a body member having a cylindrical opening therethrough eccentric with respect to and parallel to the axis of rotation of the spindle and adjusting shaft, a cylindrical tool carrying member including an inner and outer end with the inner end positioned within said opening in the body member for rotation therein and having an annular, radially outwardly extending flange at the outer end thereof in engagement with the body member about the periphery of the opening therethrough, resilient means operable between the body member and tool carrying member for urging the inner end of the tool carrying member into said opening toward said adjusting shaft, bearing means between said tool carrying member and said body member to facilitate relative rotation therebetween and means operable between said tool carrying member and said adjusting shaft for rotating said tool carrying member on relative axial movement between said adjusting shaft and spindle.

10. Structure as set forth in claim 9 wherein the means operable between the tool carrying member and adjusting shaft comprises an internally splined sleeve rigidly connected to said tool carrying member and a splined shaft within said sleeve rigidly connected to said adjusting shaft for axial movement therewith.

11. Structure as set forth in claim 9 wherein the means operable between the tool carrying member and adjusting shaft comprises a sleeve having a pair of opposed longitudinally and angularly extending slots therein secured to the tool carrying member for rotation therewith and a pin extending transversely of the adjusting shaft for axial movement therewith, the ends of which are positioned in the opposed slots in the sleeve.

12. Structure as set forth in claim 9 wherein the means operable between the tool carrying member and adjusting shaft comprises a helical gear secured to the shaft against relative rotation and for axial movement therewith, a first spur gear secured to the tool carrying member for rotation therewith, a second spur gear engaged with the first spur gear for rotation therewith, a third spur gear engaged with the pinion on said shaft for rotation therewith and a one-way clutch connected between the second and third spur gears whereby the second spur gear is rotated on axial movement of the helical gear in only one direction with the shaft.

References Cited by the Examiner
UNITED STATES PATENTS

| | | |
|---|---|---|
| 1,996,842 | 4/1935 | Stevens |
| 2,585,038 | 2/1952 | Rogacki. |
| 2,820,376 | 1/1958 | Jannenga et al. |
| 2,833,169 | 5/1958 | Briney et al. |
| 2,979,974 | 4/1961 | Craig. |
| 2,990,730 | 7/1961 | Pougnand. |
| 3,073,185 | 1/1963 | Hoffman _____ 77—58 |
| 3,125,903 | 3/1964 | Briney et al. |

WILLIAM W. DYER, Jr., *Primary Examiner.*

G. A. DOST, *Assistant Examiner.*